(12) United States Patent
Schpok (10) Patent No.: US 9,311,748 B2
(45) Date of Patent: Apr. 12, 2016

(54) METHOD AND SYSTEM FOR GENERATING AND STORING DATA OBJECTS FOR MULTI-RESOLUTION GEOMETRY IN A THREE DIMENSIONAL MODEL

(71) Applicant: Joshua Sam Schpok, Milipitas, CA (US)

(72) Inventor: Joshua Sam Schpok, Milipitas, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 13/771,612

(22) Filed: Feb. 20, 2013

(65) Prior Publication Data

US 2015/0178986 A1 Jun. 25, 2015

(51) Int. Cl.
*G06T 17/05* (2011.01)

(52) U.S. Cl.
CPC ............. *G06T 17/05* (2013.01); *G06T 2210/36* (2013.01)

(58) Field of Classification Search
CPC . G06T 13/00; G06T 2219/2021; G06T 17/05; G06T 2210/36; G06T 3/40
See application file for complete search history.

(56) References Cited

U.S. PATENT DOCUMENTS

| | | |
|---|---|---|
| 5,694,534 A | 12/1997 | White, Jr. et al. |
| 5,929,860 A | 7/1999 | Hoppe |
| 6,009,435 A | 12/1999 | Taubin et al. |
| 6,308,177 B1 | 10/2001 | Israni et al. |
| 7,197,500 B1 | 3/2007 | Israni et al. |
| 7,225,207 B1 | 5/2007 | Ohazama et al. |
| 7,266,560 B2 | 9/2007 | Lampert et al. |
| 7,436,405 B2 | 10/2008 | Losasso Petterson et al. |
| 7,643,673 B2 | 1/2010 | Rohlf et al. |
| RE41,983 E | 12/2010 | Wallner |
| 8,077,918 B2 | 12/2011 | Kirmse et al. |
| 8,166,042 B1 | 4/2012 | Praun et al. |
| 8,203,552 B2 | 6/2012 | Ingersoll et al. |
| 8,212,807 B2 | 7/2012 | Ingersoll et al. |
| 8,260,006 B1 | 9/2012 | Callari et al. |
| 2003/0235344 A1* | 12/2003 | Kang et al. ................... 382/284 |
| 2006/0265197 A1* | 11/2006 | Peterson ........................... 703/2 |
| 2010/0321386 A1* | 12/2010 | Lin et al. ....................... 345/420 |
| 2011/0007094 A1 | 1/2011 | Nash et al. |
| 2012/0011568 A1* | 1/2012 | Tahan ................................ 726/4 |

* cited by examiner

*Primary Examiner* — Maurice L McDowell, Jr.
*Assistant Examiner* — Raffi Isanians
(74) *Attorney, Agent, or Firm* — Dority & Manning, P.A.

(57) ABSTRACT

Methods and systems for generating data objects for multi-resolution geometry in a three-dimensional model are provided. A region of high resolution geometry in the three-dimensional model having a level of detail that is higher than a level of detail associated with geometry data surrounding the region of high resolution geometry can be identified. A boundary of the region of high resolution geometry can be extended and high resolution geometry can be generated within the extended boundary. The high resolution geometry can be spatially partitioned into a plurality of geospatial data objects according to a hierarchical spatial partitioning scheme. The geospatial data objects can be selectively stored in a memory. For instance, geospatial data objects associated with the extended boundary can be identified and excluded from a hierarchical tree data structure storing geometry data associated with the three-dimensional model.

18 Claims, 6 Drawing Sheets

METHOD AND SYSTEM FOR GENERATING AND STORING DATA OBJECTS FOR MULTI-RESOLUTION GEOMETRY IN A THREE DIMENSIONAL MODEL

FIELD

The present disclosure relates generally to three dimensional modeling and more particularly, to providing for multi-resolution geometry in a three dimensional model.

BACKGROUND

Geographic information systems provide for the archiving, retrieving, and manipulating of data that has been stored and indexed according to geographic coordinates of its elements. A geographic information system can be used for storing, manipulating, and displaying a three-dimensional model. The three-dimensional model can include satellite images texture mapped to geometry (e.g. terrain, buildings, structures, and other objects). A virtual camera can be used to navigate through the three-dimensional model. The virtual camera defines what portion of the three-dimensional model to display to a user.

The three-dimensional model can have any number of level-of-detail (LOD) representations that can be used to increase or decrease the complexity/resolution of the three-dimensional model as the virtual camera moves closer to or farther from the model. To facilitate processing, the geometry and other data associated with the model can be spatially partitioned into manageable pieces (e.g. geospatial data objects such volumes or other objects) for fetching and rendering data associated only with the visible portion of the model. The data objects can be arranged in a hierarchical tree data structure, such as a quadtree or octree data structure, to facilitate fetching, culling, and LOD management of the data.

High resolution geometry can be provided or substituted in certain portions of the model to produce a more realistic model. For example, high resolution geometry associated with an object such as a tree, fire hydrant, building front, or other object can be substituted into a lower resolution scene of a street. Problems can arise in storing higher resolution geometry in the hierarchical tree data structure such that the higher resolution geometry matches seamlessly with adjacent lower resolution geometry. In addition, the higher resolution geometry may not have been partitioned consistently with the spatial partitioning scheme of the three-dimensional model, resulting in some portions of the higher resolution geometry occupying only a portion of the spatial extent associated with a node in the hierarchical tree data structure.

SUMMARY

Aspects and advantages of the invention will be set forth in part in the following description, or may be obvious from the description, or may be learned through practice of the invention.

One exemplary aspect of the present disclosure is directed to a computer-implemented method of generating data objects for multi-resolution geometry in a three-dimensional model. The method includes identifying a region of high resolution geometry in the three-dimensional model. The region of high resolution geometry has a level of detail that is higher than a level of detail associated with geometry data surrounding the region of high resolution geometry in the three-dimensional model. The method further includes extending a boundary of the region of high resolution geometry to an extended boundary and generating high resolution geometry within the extended boundary. The method further includes spatially partitioning the high resolution geometry into a plurality of geospatial data objects and selectively storing one or more of the plurality of geospatial data objects in a memory. According to a particular aspect of the present disclosure, the method can include identifying one or more geospatial data objects associated with the extended boundary and selectively storing the geospatial data objects in a hierarchical tree data structure such that the one or more geospatial data objects associated with the extended boundary are excluded from the hierarchical tree data structure.

Other exemplary aspects of the present disclosure are directed to systems, apparatus, non-transitory computer-readable media, user interfaces and devices for generating and storing geospatial data objects for a multi-resolution three-dimensional model.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to methods and systems of generating and storing geospatial data objects for multi-resolution geometry in a three-dimensional model. High resolution geometry can be provided or substituted in certain portions of the model to produce a more realistic model. For example, a textured three-dimensional model can include geometry (e.g. a mesh, such as a triangle mesh or other mesh) constructed using, for instance, stereo reconstruction techniques from aerial imagery of a geographic area. This aerial mesh can be represented at varying levels of detail to facilitate display of the three-dimensional model at different virtual camera views relative to the model. It can be desirable to extend the aerial mesh to even higher resolution, such as a street level resolution, by providing higher resolution geometry in the mesh. For example, it can be desirable to provide or substitute high resolution geometry associated with objects such as trees, building fronts, and other objects into a three-dimensional model of the street. In many cases, this high resolution geometry is likely to be sparse in that only a small fraction of the mesh will include the high resolution geometry.

Geometry data associated with the three-dimensional model can be spatially partitioned into a plurality of geospatial data objects according to a hierarchical spatial partitioning scheme to facilitate fetching and level of detail management of the three-dimensional model. The generation of geospatial data objects for sparse patches of high resolution geometry can result in cracks where the lower resolution geometry does not completely finish the details of the high resolution geometry. For instance, if high resolution geometry data associated with a tree is substituted into a lower resolution of a street, high resolution geometry data associated with where the tree attaches to the street can be missing.

To address this issue, aspects of the present disclosure are directed to extending the boundary of high resolution geometry into the surrounding lower resolution geometry. For instance, the boundary can be extended by a radius of twice the geospatial extent of a geospatial data object associated with the level of detail of the high resolution geometry. High resolution geometry can be generated within the extended boundary, for instance, by upsampling the geometry within the extended boundary. The high resolution geometry can then be spatially partitioned into a plurality of geospatial data objects pursuant to a hierarchical spatial partitioning scheme, such as a hierarchical spatial partitioning scheme associated with the three-dimensional model.

Once generated, the plurality of geospatial data objects can be stored as payloads of nodes in a hierarchical tree data structure, such as an octree data structure, storing information for the three-dimensional model. When storing the plurality of geospatial data objects in the hierarchical tree data structure, geospatial data objects associated with the extended boundary can be identified and excluded from the hierarchical tree data structure. As a result, high resolution geometry data is stored in the hierarchical tree data structure only for geospatial data objects associated with regions completely within the extended boundary. This allows for the geospatial data objects for the high resolution geometry to be stored in the hierarchical tree data structure in a manner that allows the high resolution geometry to match seamlessly with the adjacent lower resolution geometry in the three-dimensional model.

Figure 1:
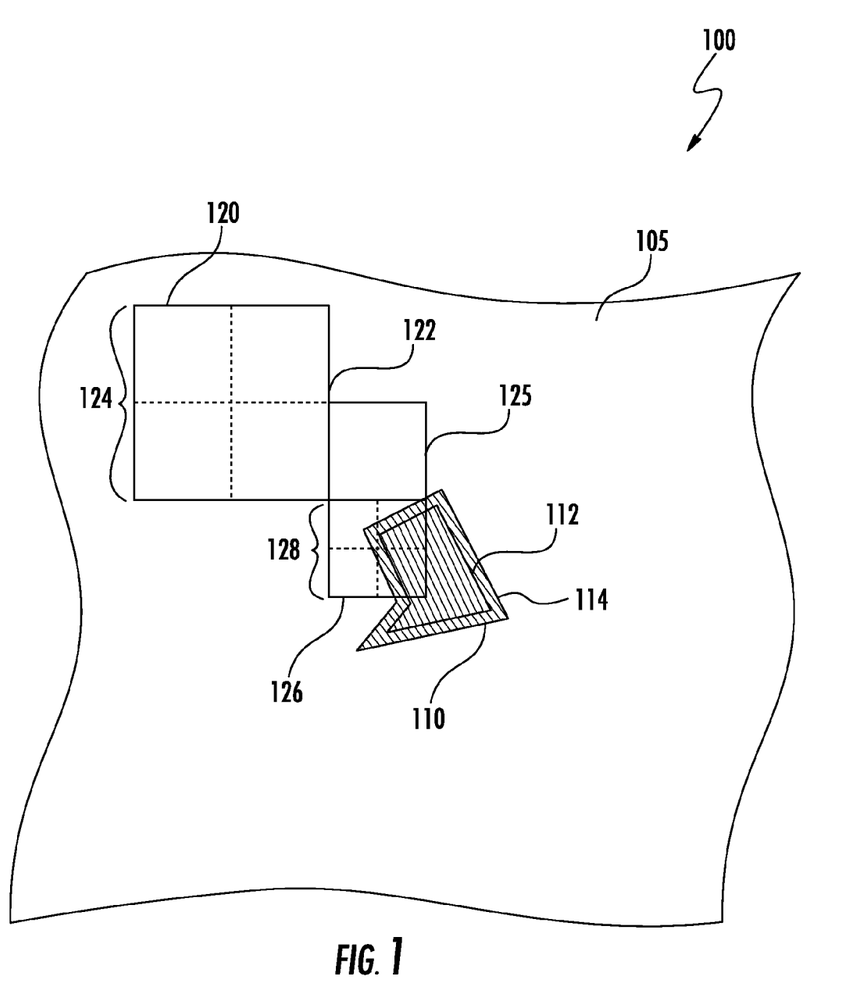
FIG. 1 depicts a simplified representation of a three dimensional model having a region of high resolution geometry according to an exemplary embodiment of the present disclosure.

Exemplary Generation and Storage of Geospatial Data Objects for Multi-Resolution Geometry Referring now to the figures, exemplary embodiments of the present disclosure will now be discussed in detail. FIG. 1 depicts a simplified representation of geometry data 105 associated with a three dimensional model 100, such as a three-dimensional model of a geographic area. The three-dimensional model 100 can be provided by a geographic information system, such as the Google Maps™ mapping application and the Google Earth™ virtual globe application provided by Google Inc. While the figures illustrate two-dimensional representations of the three-dimensional model for purposes of illustration and discussion, one of ordinary skill in the art, using the disclosures provided herein, will recognize that two-dimensional representations can be representative of three-dimensional elements.

The geometry data 105 can be a mesh, such as triangle mesh or other mesh. The mesh can include a plurality of polygons (e.g. triangles) that are used to model the geometry of a geographic area. In one example, the geometry data 105 can be stereo reconstructions generated from aerial or satellite imagery.

The geometry data 105 can be spatially partitioned into a plurality of discrete geospatial data objects. Spatial partitioning refers to dividing a space into distinct subsets. For instance, geometry data 105 for the three-dimensional model 100 can be spatially partitioned into a plurality of discrete geospatial volumes, such as discrete geospatial volume 125. Each discrete geospatial data object can store geometry data 105 and other data associated with geographic coordinates within the space defined by the discrete geospatial data object.

The geometry data 105 can be spatially partitioned according to a hierarchical spatial partitioning scheme 120. A hierarchical spatial partitioning scheme recursively partitions the geometry data into a plurality of discrete segments and sub-segments according to a set of partitioning rules. For instance, the hierarchical spatial partitioning scheme 120 can provide for the recursive partitioning of a geospatial volume 122 into eight equal sub-volumes 124. Four sub-volumes 124 are illustrated in the two-dimensional representation of the discrete geospatial volume 122 for purposes of simplicity of illustration. The hierarchical spatial partitioning scheme 120 can provide for the further sub-division of each geospatial volume into yet further discrete geospatial volumes as the partitioning scheme progresses through different levels in the hierarchy. The hierarchical spatial partitioning scheme 120 can partition a space in any suitable manner, such as along axes defined by rectangular or spherical coordinates for the space. While the present disclosure will be discussed with reference to geospatial data objects that include discrete geospatial volumes, other suitable geospatial data objects can be used without deviating from the scope of the present disclosure.

Each level in the hierarchical spatial partitioning scheme can be associated with a different level of detail for the geometry data 105. The resolution and/or level of detail of a discrete geospatial data object can be implicitly defined by the spatial extent of the discrete geospatial data object. In particular, a geospatial data object having a smaller spatial extent can be associated with a higher level of detail. Referring to FIG. 1, the geospatial data objects 128 can be associated with a higher level of detail in the hierarchical spatial partitioning scheme 120 than the geospatial data objects 125 and 126.

The geospatial data objects can be indexed and stored in a memory for later processing and retrieval. For instance, the geospatial data objects can be stored and/or indexed in a memory as payloads of nodes in a hierarchical tree data structure, such as an octree data structure. The hierarchical tree data structure can include a plurality of node levels configured in a parent-child relationship. For instance, parent nodes in a first node level can include references to a plurality of child nodes in a second node level. Each of the child nodes in the second node level can include references to their own child nodes in a third node level, and so on. Geospatial data represented by the geospatial volumes at each hierarchical level in the hierarchical spatial partitioning scheme 120 can be associated with nodes at a particular node level in the hierarchical tree data structure.

Figure 2:
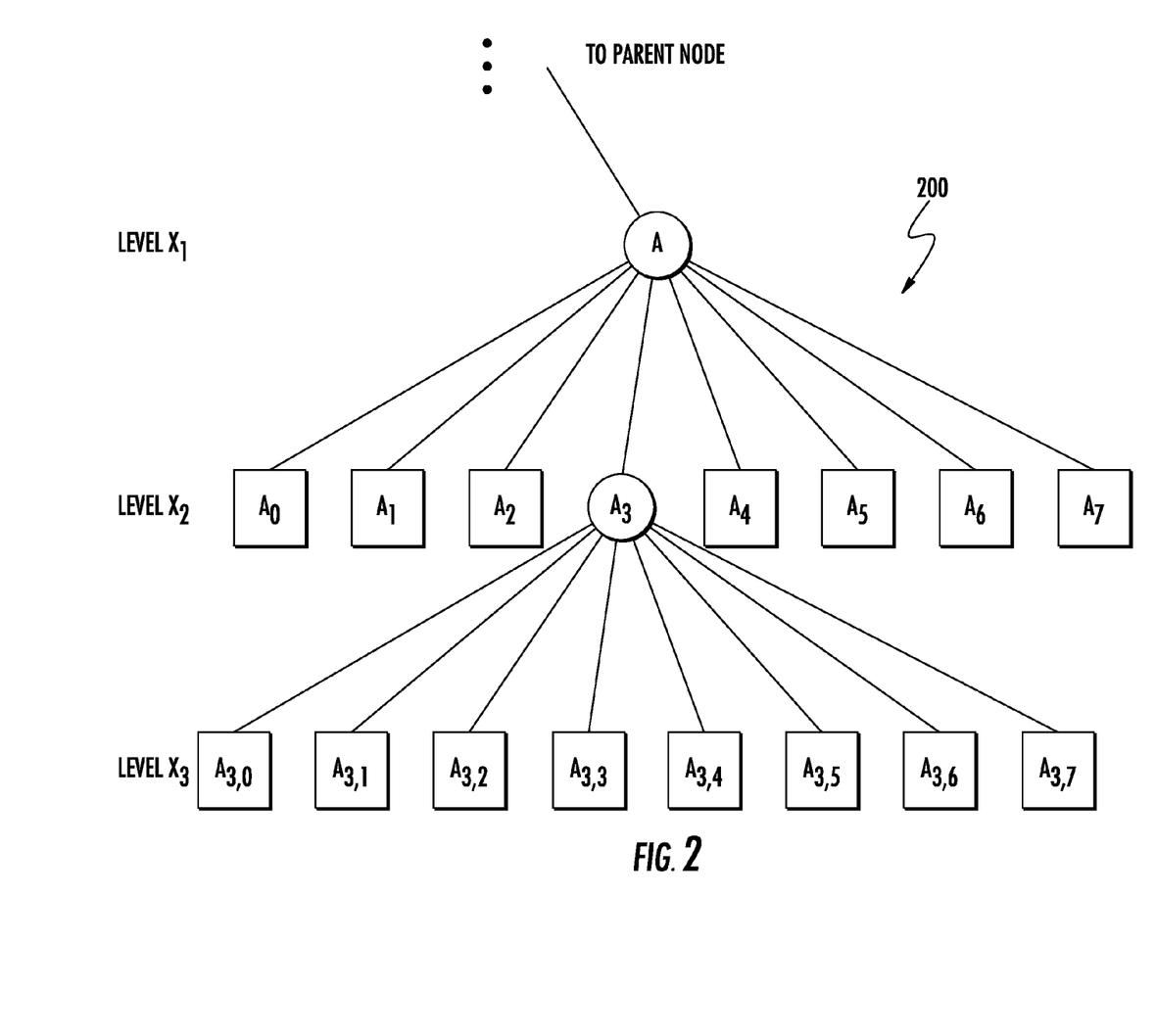
FIG. 2 depicts a representation of a portion of an exemplary hierarchical tree data structure according to an exemplary embodiment of the present disclosure.

FIG. 2 depicts a portion of an exemplary octree hierarchical tree data structure 200 that can store geospatial data objects according to an exemplary embodiment of the present disclosure. The hierarchical tree data structure 200 includes a plurality of node levels $X_1$, $X_2$, and $X_3$. Every node in the data structure 200 can include up to eight child nodes. In the example shown, a node A associated with node level $X_1$ in the data structure 200 includes references to eight child nodes $A_0$, $A_1$, $A_2$, $A_3$, $A_4$, $A_5$, $A_6$, $A_7$. The eight child nodes $A_0$, $A_1$, $A_2$, $A_3$, $A_4$, $A_5$, $A_6$, $A_7$ correspond to node level $X_2$ in the data structure 200. Following this pattern, each of the eight child nodes can include references to eight child nodes corresponding to a third node level in the data structure. As an example, node $A_3$ includes references to eight child nodes $A_{3,0}$, $A_{3,1}$, $A_{3,2}$, $A_{3,4}$, $A_{3,4}$, $A_{3,5}$, $A_{3,6}$, and $A_{3,7}$ corresponding to node level $X_3$ in the data structure 200. The node A can also be a child of another node (not shown in FIG. 2) of the data structure 200. While only three levels of the hierarchical tree data structure 200 are shown, the hierarchical tree data structure 200 can have any desired number of levels depending on the application.

The hierarchical tree data structure 200 can be particularly well suited for indexing geospatial data spatially partitioned pursuant to the exemplary hierarchical spatial partitioning scheme 120 according to aspects of the present disclosure. Referring to the example of FIG. 1, the geospatial data object 126 can be stored as a part of the payload of node A in the node level $X_1$ in the hierarchical tree data structure 200. The geospatial data object 126 can be spatially partitioned according to the spatial partitioning scheme 120 to obtain sub-geographic data objects 128. Each of the geographic data objects 128 can be mapped or associated with one of the eight child nodes $A_0$, $A_1$, $A_2$, $A_3$, $A_4$, $A_5$, $A_6$, $A_7$ in the node level $X_2$ in the data structure 200. In this manner, there can be a direct mapping between nodes in the hierarchical tree data structure 400 and geospatial data objects obtained pursuant to the hierarchical spatial partitioning scheme 120.

Referring to FIG. 1, the three-dimensional model 100 can include a region of high resolution geometry 110. The region of high resolution geometry 110 can be associated with a level of detail that is higher than then the level of detail of the geometry data 105. The region of high resolution geometry 110 can be substituted or provided in the geometry data 105 to provide a more realistic appearance of a geographic area represented by the three-dimensional model 100. For instance, the high resolution geometry 110 can be associated with an object, such as a tree, building front, fire hydrant, or other object to provide a more realistic view of a streetscape in the three-dimensional model. The region of high resolution geometry 110 can be an example of many regions of sparsely provided high resolution geometry in the three-dimensional model 100.

In one implementation, the region of high resolution geometry 110 can be associated with a street level resolution. For instance, high resolution geometry 110 can be stereo reconstructions generated from street level imagery. Street level imagery can be imagery acquired of a geographic area from a perspective at or near the ground level. High resolution geometry 110 can also be generated from data collected using a laser range finder. The laser range finder can acquire data representative of distances to points on a surface from a camera view associated with a camera used to acquire imagery from a perspective at or near the ground level. The region of high resolution geometry 110 can include a mesh portion 112 associated with a street level resolution and a blended mesh portion 114 that provides a blend between the resolution of mesh portion 112 and the surrounding geometry data 105.

Incorporating the region of high resolution geometry 110 into the hierarchical spatial partitioning scheme 120 of the surrounding geometry 105 and corresponding hierarchical tree data structure can be non-trivial. For instance, because of the sparseness of the high resolution geometry in the three-dimensional model, the hierarchical tree data structure may not be balanced. High resolution geometry can be available for some portions of the mesh while other portions of the mesh have less high resolution geometry.

Moreover, a lower resolution geospatial data object associated with the surrounding geometry can be rendered adjacent to a higher resolution geospatial data object associated with the region of high resolution geometry. For instance, a geospatial data object 125 associated with the lower resolution geometry data 105 can be rendered adjacent to geospatial data objects 128 associated with the level of detail of the region of high resolution geometry 110. The higher resolution geospatial data objects 128 can include high frequency features which can lead to cracks between the two geospatial data objects where the lower resolution geospatial data object 125 does not completely finish these features.

In addition, the region of high resolution geometry 110 may not have been generated according to the hierarchical spatial partitioning scheme 120 associated with the surrounding geometry 105. As a result, partitioning the region of high resolution geometry 110 according to the spatial partitioning scheme 120 can lead to some portions of the region of high resolution geometry 110 not occupying the entire geospatial extent of a geospatial object. For instance, the geospatial objects 128 are only partially filled with high resolution geometry. This can be particularly problematic when a geospatial data object, such as geospatial data object 126, contains child geospatial data objects (e.g. geospatial data objects 128) that are only partially filled with high resolution geometry. The empty part of the geospatial data object can be filled with the low resolution geometry. However, it can be non-trivial to determine if a geospatial data object is partially filled and to define the extent of the non-filled portions of the geospatial data object. It can also be difficult to connect the partially filled geospatial data object to the surrounding geometry.

Aspects of the present disclosure generate and store geospatial data objects for the region of high resolution geometry 110 in a manner to improve incorporation of the region high resolution geometry 110 into the three-dimensional model. In particular, the region of high resolution geometry 110 can be extended out into the lower resolution geometry data 105. Geospatial data objects can be generated for the extended high resolution geometry. The geospatial data objects can be selectively stored in the memory such that a geospatial data object is stored in the hierarchical tree data structure only if the geospatial data object does not contain a boundary edge of the extended region of high resolution geometry 110. This allows for generation of geospatial data objects in a manner to improve matching with adjacent lower resolution geometry. In addition, the storing and indexing of geospatial data objects only partially filled with high resolution geometry can be reduced.

Figure 3:
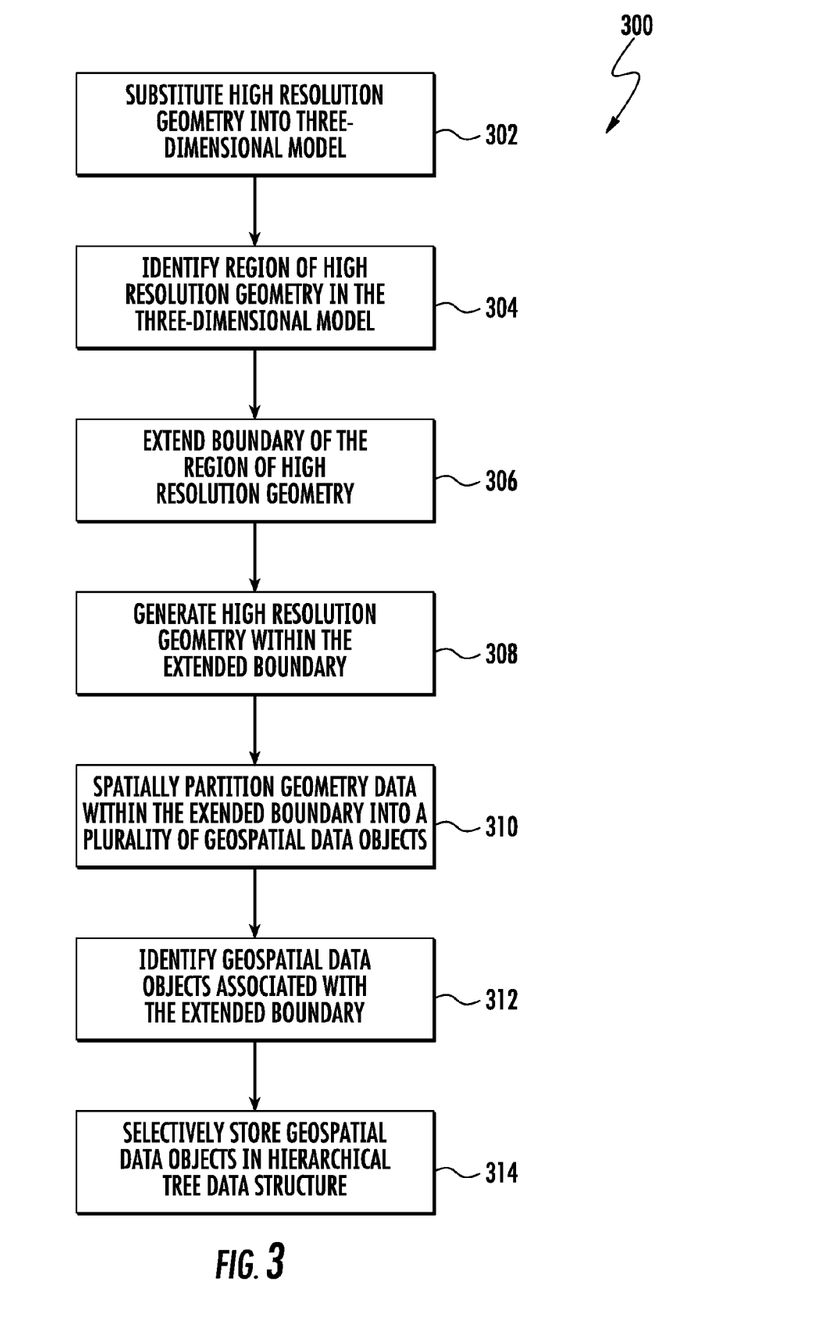
FIG. 3 depicts a flow diagram of an exemplary method for generating geospatial data objects for multi-resolution geometry in a three-dimensional model according to an exemplary embodiment of the present disclosure.

FIG. 3 depicts a flow diagram of an exemplary method (300) of generating and storing geospatial data objects according to an exemplary embodiment of the present disclosure. The method (300) of FIG. 3 can be implemented using any computer-based system, such as the system 400 of FIG. 8. In addition, FIG. 3 depicts steps performed in a particular order for purposes of illustration and discussion. Those of ordinary skill in the art, using the disclosures provided herein, will understand that various steps of the methods discussed herein can be omitted, rearranged, combined and/or adapted in various ways.

At (302), a region of high resolution geometry can be provided or substituted into the three-dimensional model. For instance, as illustrated in FIG. 1, the region of high resolution geometry 110 can be substituted into the surrounding geometry 105 of the three-dimensional model 100. The region of high resolution geometry can be associated with a level of detail that is greater than the level of detail of the surrounding geometry. In one particular implementation, the region of high resolution geometry can be associated with a street level resolution while the surrounding geometry is associated with an aerial image resolution of the three-dimensional model provided by a geographic information system. The region of high resolution geometry can be substituted into the three-dimensional model in any suitable manner. For example, the region of high resolution geometry can replace lower resolution geometry in the three-dimensional model. The region of high resolution geometry can be substituted into three-dimensional at sparse locations.

At (304), the method includes identifying the region of high resolution geometry in the three-dimensional model. The region of high resolution geometry can be identified for purposes of generating geospatial data objects for the region of high resolution geometry. Any suitable technique can be used to identify the region of high resolution geometry. In one implementation, the region of high resolution geometry can be selected (e.g. by user input) for generation of geospatial data objects. In another implementation, analytical techniques can be performed on the three-dimensional model to identify the boundaries of the region of high resolution geometry. For instance, the three-dimensional model can be analyzed to identify regions of higher frequency geometry relative to surrounding geometry in the three-dimensional model. In another implementation, the region of high resolution geometry is identified when the region is provided or substituted into the three-dimensional model.

Figure 4:
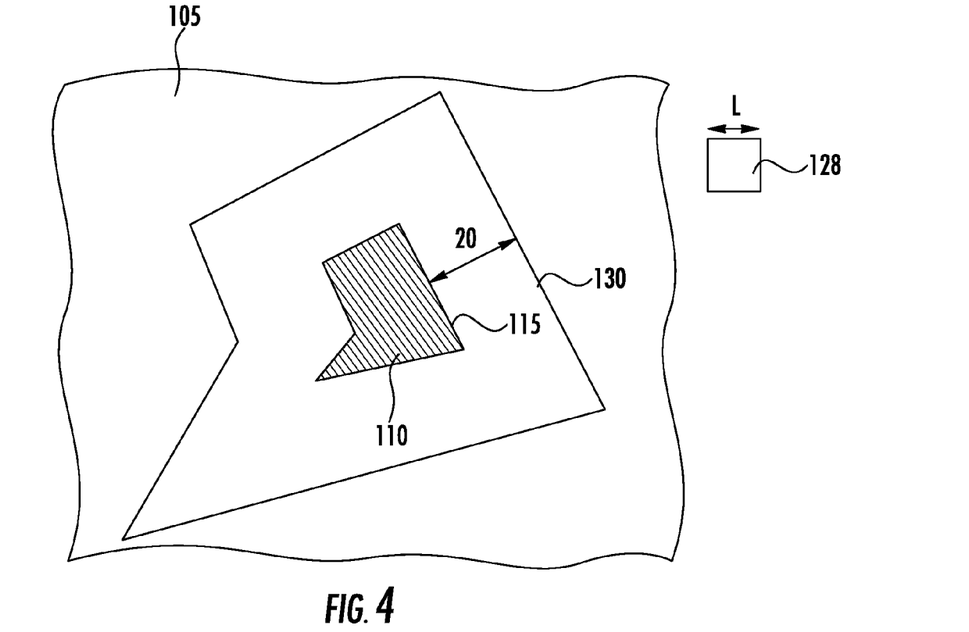
FIG. 4 depicts extending a boundary of a region of high resolution geometry according to an exemplary embodiment of the present disclosure.

Once the region of high resolution geometry has been identified, the boundary of the region of high resolution geometry is extended into the surrounding geometry of three-dimensional model (306). FIG. 4 depicts the exemplary extension of a region of high resolution geometry into the surrounding geometry of the three-dimensional model. In particular, the region of high resolution geometry 110 is associated with a level of detail that is higher than the level of detail of the surrounding geometry 105. The region of high resolution geometry 110 includes a boundary 115. The boundary 115 is extended into the surrounding geometry 105 to obtain the extended boundary 130.

In a particular implementation, the boundary 115 can be extended by at least 2 L to obtain the extended boundary 130. L refers to the geospatial extent of a geospatial data object associated with the level of detail of the region of high resolution geometry 110 in the spatial partitioning scheme associated with the three-dimensional model. For example, as shown in FIG. 4, L is equal to the width/length/depth of geospatial data object 128. Referring to FIG. 1, geospatial data object 128 is an exemplary geospatial data object for a level in the hierarchical spatial partitioning scheme 120 associated with the level of detail of the region of high resolution geometry 110.

Figure 5:
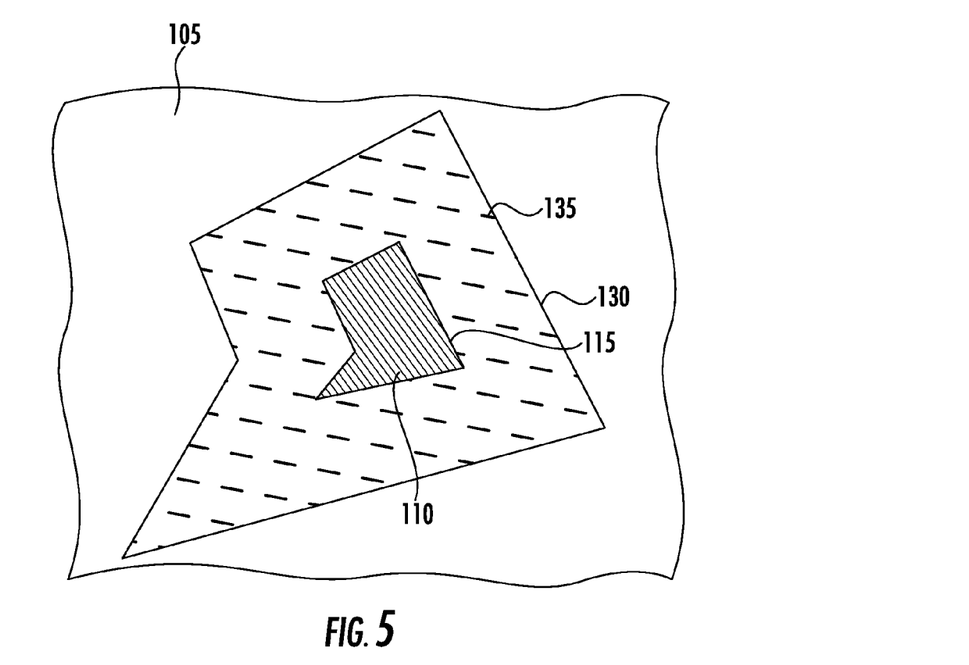
FIG. 5 depicts generating high resolution geometry data within the extended boundary according to an exemplary embodiment of the present disclosure.

Referring back to FIG. 3 at (308), high resolution geometry is generated within the extended boundary. FIG. 5 depicts the exemplary generation of high resolution geometry 135 within the extended boundary 130. The high resolution geometry 135 can be generated by upsampling the lower resolution geometry 105 that is within the extended boundary 130. For instance, geometry data within the extended boundary having a level of detail that is less than a level of detail associated with the region of high resolution geometry can be identified. The identified geometry data can then be upsampled such that the geometry data 135 within the extended boundary 130 has a level of detail that matches the level of detail of the region of high resolution geometry 110. Upsampling can refer to increasing the number of polygons (e.g. triangles) in the lower resolution geometry 105 such that an increased number of polygons is used to model the geometry 105. Upsampling is a solution that allows for the transition between low resolution geometry and upsampled geometry to remain relatively seamless.

Figure 6:
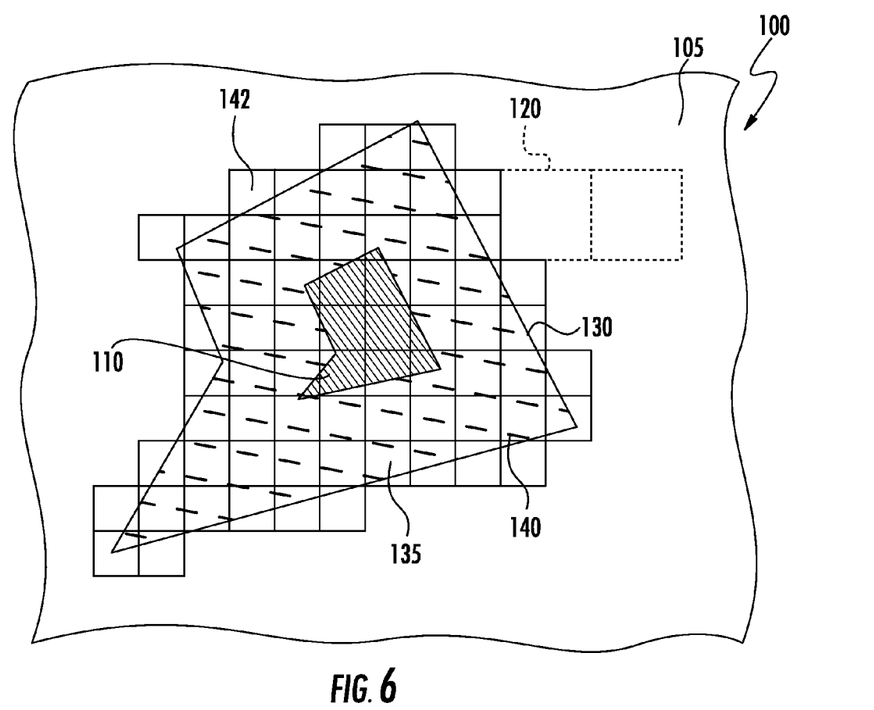
FIG. 6 depicts spatially partitioning geometry data within the extended boundary according to an exemplary embodiment of the present disclosure.

Referring to FIG. 3 at (310), the method includes spatially partitioning the high resolution geometry within the extend boundary into a plurality of geospatial data objects. For instance, as shown in FIG. 6, the high resolution geometry 135 within the extended boundary, including the region of high resolution geometry 110, is spatially partitioned into a plurality of discrete geospatial volumes 140. Certain discrete geospatial volumes 140 are located entirely within the extended boundary 130. Other discrete geospatial volumes 142 are located at the boundary 130 and can include high resolution geometry 135 as well as lower resolution geometry data 105.

The high resolution geometry within the extended boundary 130 can be spatially partitioned into discrete geospatial data objects in any suitable manner. In one implementation, the high resolution geometry can be spatially partitioned in a manner consistent with the grid structure of the hierarchical spatial partitioning scheme 120 associated with the three-dimensional model 100. This can facilitate grid matching and alignment of the high resolution geometry within the extended boundary with the surrounding geometry data 105. However, the high resolution geometry within the extended boundary 130 can be spatially partitioned in a manner initially decoupled from the grid structure of the spatial partitioning scheme 120 of the three-dimensional model 100. In this case, there should be geospatial data objects associated with lower resolution geometry data that overlap the high resolution geometry within the extended boundary 130 in the hierarchal spatial partitioning scheme 120 for the three-dimensional model.

As shown in FIG. 6, the problem of geospatial data objects being partially filled with high resolution geometry has been pushed out to the extended boundary. In particular, discrete geospatial data volumes 142 located at the extended boundary 130 can be partially filled with high resolution geometry 135 in addition to surrounding geometry data 105. To address this issue, the discrete geospatial data objects can be selectively stored in a memory such that only geospatial data objects completely within the extended boundary are stored in the hierarchical tree data structure for the three-dimensional model 100.

Figure 7:
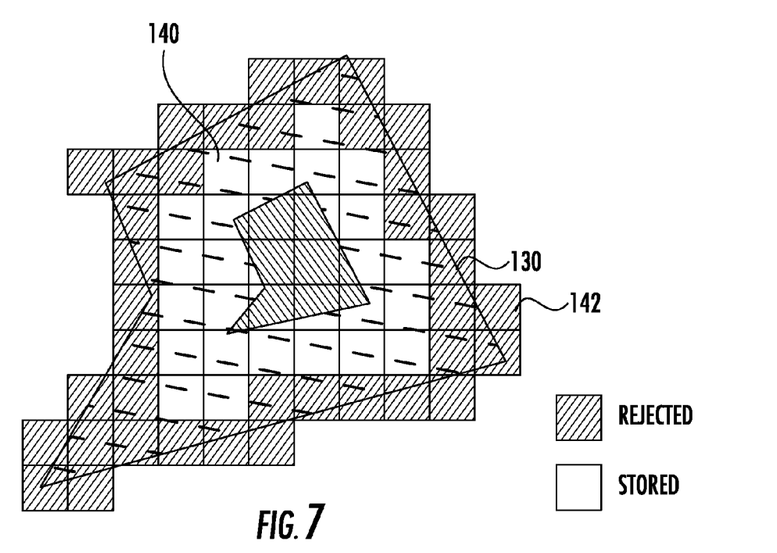
FIG. 7 depicts identifying geospatial data objects associated with the extended boundary according to an exemplary embodiment of the present disclosure.

In particular, at (312) of FIG. 3, geospatial data objects associated with the extended boundary are identified. For instance, as shown in FIG. 7, the discrete geospatial volumes 142 associated with the extended boundary 130 are identified. The discrete geospatial volumes 142 can be identified in any suitable manner. In one particular implementation, the discrete geospatial volumes 142 associated with the extended boundary 130 can be identified by identifying geospatial volumes having a mesh polygon (e.g. a mesh triangle) with at least one edge along the extended boundary.

Referring to FIG. 3 at (314), the method includes selectively storing the geospatial data object in the hierarchal tree data structure associated with the three-dimensional model such that the geospatial data objects associated with the extended boundary are excluded from the hierarchical tree data structure. For instance, as shown in FIG. 7, the discrete geospatial data volumes 142 are rejected from being included in the hierarchical tree data structure while the discrete geospatial data volumes 140 are stored in the hierarchical tree data structure.

Selectively storing geospatial data objects in this manner stores only those geospatial data objects completely contained within the extended boundary. All of the high resolution geometry 135 created within the extended boundary 130 may not be stored in the hierarchical tree data structure. However, if the boundary 115 of the region of high resolution geometry 110 is extended by at least twice the geospatial extent of a geospatial data object associated with the level of detail of the region of high resolution geometry 110 as shown in FIG. 4, geospatial data objects are created for all high resolution geometry in the region of high resolution geometry 110 and along the boundary 115 of the region of high resolution geometry 110.

Other suitable techniques can be used to store geospatial data objects for the region of high resolution geometry 110. For instance, in one aspect, the region of geospatial data objects 110 can be spatially partitioned according to a hierarchical spatial partitioning scheme. Geospatial data objects associated with the boundary 115 of the region of high resolution geometry can be white listed to indicate that such geospatial data objects may be only partially filled with high resolution geometry. Suitable techniques, such as upsampling, can then be performed to ensure that the white listed geospatial data objects match seamlessly with the surrounding lower resolution geometry.

Figure 8:
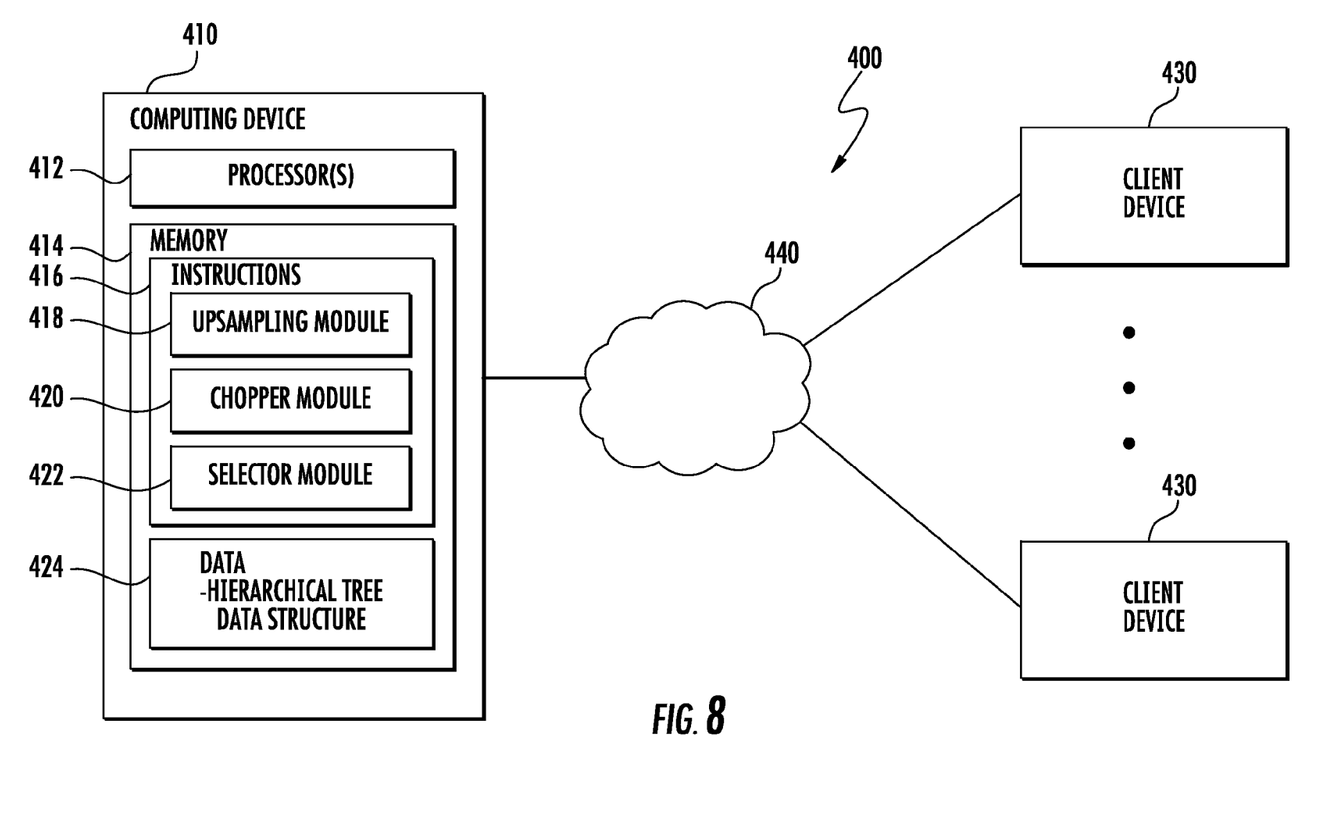
FIG. 8 depicts an exemplary computer-based system for generating and storing geospatial data objects according to an exemplary embodiment of the present disclosure.

Exemplary Computer Based System for Generating and Storing Geospatial Data Objects FIG. 8 depicts an exemplary computing system 400 that can be used to implement the methods and systems for generating and storing geospatial data objects for multi-resolution geometry according to exemplary aspects of the present disclosure. The system 400 includes a computing device 410. The computing device 410 can be any machine capable of performing calculations automatically. For instance, the computing device can include a general purpose computer, special purpose computer, laptop, desktop, integrated circuit, mobile device, smartphone, tablet, or other suitable computing device. The computing device 410 can have a processor(s) 412 and a memory 414. The computing device 410 can also include a network interface used to communicate with one or more remote computing devices (e.g. client devices) 430 over a network 440. In one exemplary implementation, the computing device 410 can be a server, such as a web server, used to host a geographic information system, such as the Google Maps™ and/or the Google Earth™ geographic information systems provided by Google Inc.

The processor(s) 412 can be any suitable processing device, such as a microprocessor. The memory 414 can include any suitable computer-readable medium or media, including, but not limited to, RAM, ROM, hard drives, flash drives, or other memory devices. The memory 414 can store information accessible by processor(s) 412, including instructions 416 that can be executed by processor(s) 412. The instructions 416 can be any set of instructions that when executed by the processor(s) 412, cause the processor(s) 412 to provide desired functionality. For instance, the instructions 416 can be executed by the processor(s) 412 to implement an upsampling module 418, a chopper module 420, and a selector module 422.

The upsampling module 418 can be configured to extend a boundary of a region of high resolution geometry in a three-dimensional model and to generate high resolution geometry within the extended boundary. For instance, the upsampling module 418 can upsample geometry data within the extended boundary such that the geometry data within the extended boundary has a level of detail that matches the level of detail of the region of high resolution geometry.

The chopper module 420 can be configured to spatially partition the high resolution geometry into a plurality of geospatial data objects. For instance, the chopper module can be configured to spatially partition the high resolution geometry into a plurality of discrete geospatial volumes according to a hierarchical spatial partitioning scheme associated with the three-dimensional model.

The selector module 422 can be configured to identify one or more of the plurality of the geospatial data objects associated with the extended boundary and to selectively store the geospatial data objects in a memory. For instance, the selector module 422 can exclude discrete geospatial volumes associated with the extended boundary from a hierarchical tree data structure storing geometry data for the three-dimensional model.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 414 can also include data 424 that can be retrieved, manipulated, created, or stored by processor(s) 412. For instance, memory 414 can be encoded with a hierarchical tree data structure, such as an octree data structure, storing geospatial data objects for the three-dimensional model. The data 424 can be stored in one or more databases. The one or more databases can be connected to the computing device 410 by a high bandwidth LAN or WAN, or can also be connected to computing device 410 through network 440. The one or more databases can be split up so that it is located in multiple locales.

The computing device 410 can exchange data with one or more client devices 430 over the network 440. Although two clients are illustrated in FIG. 4, any number of clients 430 can be connected to the computing device 410 over the network 440. The client devices 430 can be any suitable type of computing device, such as a general purpose computer, special purpose computer, laptop, desktop, integrated circuit, mobile device, smartphone, tablet, or other suitable computing device. Responsive to a request for information, the computing device 410 can encode data, such as geospatial data objects, in one or more data files and provide the data files to the client devices 430 over the network 440.

The network 440 can be any type of communications network, such as a local area network (e.g. intranet), wide area network (e.g. Internet), or some combination thereof. The network 440 can also include a direct connection between a client device 430 and the computing device 410. In general, communication between the computing device 410 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of generating data objects for multi-resolution geometry in a three-dimensional model, comprising:
    identifying, by one or more computing devices, a region of high resolution geometry in a multi-resolution three-dimensional model, the region of high resolution geometry having a first level of detail that is higher than a second level of detail associated with geometry data surrounding the region of high resolution geometry in the three-dimensional model;
    extending, by the one or more computing devices, a boundary of the region of high resolution geometry by at least twice a geospatial extent of a geospatial data object associated with the level of detail of the region of high resolution geometry to an extended boundary such that the extended boundary encompasses geometry data associated with the first level of detail and geometry data associated with the second level of detail;
    generating, by the one or more computing devices, high resolution geometry within the extended boundary such that a resolution of the geometry data associated with the second level of detail within the extended boundary matches the resolution of the geometry data associated with the first level of detail;
    spatially partitioning, by the one or more computing devices, the high resolution geometry into a plurality of geospatial data objects; and
    selectively storing, by the one or more computing devices, one or more of the plurality of geospatial data objects in a memory.

2. The method of claim 1, wherein selectively storing one or more of the plurality of geospatial data objects in a memory comprises:
    identifying, by the one or more computing devices, one or more geospatial data objects associated with the extended boundary; and
    selectively storing, by the one or more computing devices, the geospatial data objects in a hierarchical tree data structure such that the one or more geospatial data objects associated with the extended boundary are excluded from the hierarchical tree data structure.

3. The computer-implemented method of claim 1, wherein the method further comprises substituting, by the one or more computing devices, the region of high resolution geometry in the three-dimensional model.

4. The computer-implemented method of claim 1, wherein spatially partitioning, by the one or more computing devices, geometry data within the extended boundary into a plurality of geospatial data objects comprises spatially partitioning, by the one or more computing devices, the geometry data within the extended boundary pursuant to a hierarchical spatial partitioning scheme associated with the three-dimensional model.

5. The computer-implemented method of claim 1, wherein generating high resolution geometry within the extended boundary comprises:
    identifying, by the one or more computing devices, the geometry data associated with the second level of detail within the extended boundary; and
    upsampling, by the one or more computing devices, the identified geometry data.

6. The computer-implemented method of claim 5, wherein upsampling, by the one or more computing devices, the identified geometry data comprises upsampling, by the one or more computing devices, the identified geometry data such that the identified geometry data has a resolution that matches the high resolution geometry.

7. The computer-implemented method of claim 2, wherein identifying, by the one or more computing devices, one or more geospatial data objects associated with the extended boundary comprises identifying, by the one or more computing devices, one or more geospatial data objects having a mesh polygon with at least one edge along the extended boundary.

8. The computer-implemented method of claim 1, wherein the geospatial data objects are discrete geospatial volumes.

9. The computer-implemented method of claim 2, wherein the hierarchical tree data structure comprises an octree data structure.

10. The computer-implemented method of claim 1, wherein the three dimensional model is a stereo reconstruction.

11. The computer-implemented method of claim 10, wherein the region of high resolution geometry is associated with a street level resolution.

12. The computer-implemented method of claim 10, wherein the region of high resolution geometry is generated based on data acquired from a laser range finder.

13. A computing system for providing geospatial data objects associated with a three-dimensional model, the computing system comprising one or more processors configured to implement one or more modules, the one or more modules comprising:
    an upsampling module-implemented by the one or more processors, the upsampling module configured to extend a boundary of a region of high resolution geometry in the three-dimensional model by at least twice a geospatial extent of a geospatial data object associated with the level of detail of the region of high resolution geometry to an extended boundary such that the extended boundary encompasses geometry data associated with the first level of detail and geometry data associated with the second level of detail, and the upsampling module further configured to generate high resolution geometry within the extended boundary such that a resolution of the geometry data associated with the second level of detail within the extended boundary matches the resolution of the geometry data associated with the first level of detail, the first level of detail being associated with a higher resolution than the second level of detail;

a chopper module implemented by the one or more processors, the chopper module configured to spatially partition the high resolution geometry into a plurality of discrete geospatial volumes; and a selector module implemented by the one or more processor, the selector module configured to identify one or more of the plurality of discrete geospatial volumes associated with the extended boundary and to selectively store the discrete geospatial volumes in a memory encoded with a hierarchical tree data structure such that discrete geospatial volumes associated with the extended boundary are excluded from the hierarchical tree data structure.

14. The computing system of claim 13, wherein the computing system is configured to provide one or more of the discrete geospatial volumes for the three dimensional model to a remote computing device via a network interface.

15. The computing system of claim 13, wherein the hierarchical tree data structure is an octree data structure.

16. The computing system of claim 13, wherein the three dimensional model is a stereo reconstruction generated from aerial imagery and the high resolution geometry is generated based on data acquired from a laser range finder.

17. A computing system comprising one or more processors and at least one memory, the one or more processors configured to execute computer-readable instructions stored on the at least one memory to cause the one or more processors to perform operations, the operations comprising:

identifying a region of high resolution geometry in a multi-resolution three-dimensional model, the region of high resolution geometry having a first level of detail that is higher than a second level of detail associated with geometry data surrounding the region of high resolution geometry in the three-dimensional model;

extending a boundary of the region of high resolution geometry by at least twice a geospatial extent of a geospatial data object associated with the level of detail of the region of high resolution geometry to an extended boundary such that the extended boundary encompasses geometry data associated with the first level of detail and geometry data associated with the second level of detail;

generating high resolution geometry within the extended boundary such that a resolution of the geometry data associated with the second level of detail within the extended boundary matches the resolution of the geometry data associated with the first level of detail;

spatially partitioning the high resolution geometry into a plurality of geospatial data objects;

identifying one or more geospatial data objects associated with the extended boundary; and selectively storing the geospatial data objects in a hierarchical tree data structure such that the one or more geospatial data objects associated with the extended boundary are excluded from the hierarchical tree data structure.

18. The computing system of claim 17, wherein the geometry data within the extended boundary is spatially partitioned pursuant to a hierarchical spatial partitioning scheme associated with the three-dimensional model.

* * * * *